United States Patent [19]

Masclet

[11] 4,108,392
[45] Aug. 22, 1978

[54] FISHING REEL

[75] Inventor: Jean Masclet, Paris, France

[73] Assignee: S.E.D.I.C., Montrouge, France

[21] Appl. No.: 774,999

[22] Filed: Mar. 7, 1977

[30] Foreign Application Priority Data

Mar. 26, 1976 [FR] France .............................. 76 08788
Feb. 8, 1977 [FR] France .............................. 77 03413

[51] Int. Cl.$^2$ ............................................ A01K 89/00
[52] U.S. Cl. ...................... 242/84.21 A; 242/84.1 A; 242/84.21 W
[58] Field of Search ............... 242/84.21 W, 84.21 A, 242/84.21 R, 84.1 A, 84.2 G, 84.2 F

[56] References Cited

U.S. PATENT DOCUMENTS

| | | | |
|---|---|---|---|
| 2,622,823 | 12/1952 | Tlustos | 242/84.21 W |
| 3,459,387 | 8/1969 | Miyamae | 242/84.1 A |
| 3,743,207 | 7/1973 | McMickle | 242/84.21 A |
| 3,834,644 | 9/1974 | Stackawicz | 242/84.2 G |

FOREIGN PATENT DOCUMENTS 581,574 10/1946 United Kingdom ............ 242/84.21 W Primary Examiner—George F. Mautz
Attorney, Agent, or Firm—J. Harold Nissen

[57] ABSTRACT

A fishing reel having a body supporting a rotatable spool and a spool drive. The spool drive includes a principal shaft and secondary shaft rotationally connected together, and a frame rotatable about the principal shaft and connecting the two shafts together so that their axes intersect. The spool is connected to the secondary shaft and is rotatable therewith in response to rotation of said principal shaft; the secondary shaft is also connected with the frame and rotates therewith. The reel also includes a line guide which is pivotable from its winding to its unwinding or casting position; the line guide cooperating with the frame and the spool to ensure suitable layering of the line onto the spool by pivoting and rotating the secondary shaft about the primary shaft.

15 Claims, 16 Drawing Figures

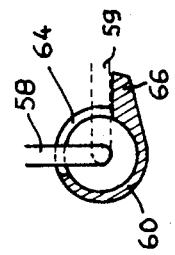
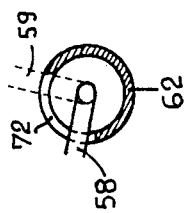
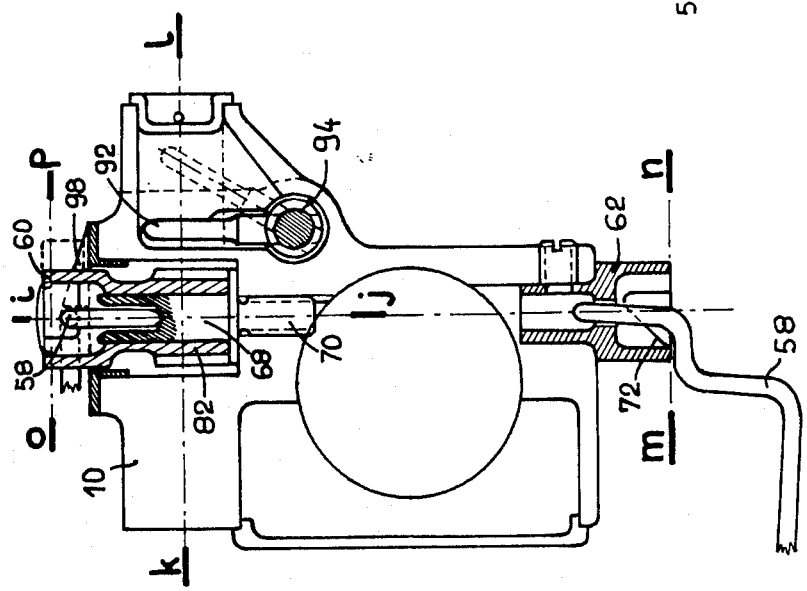
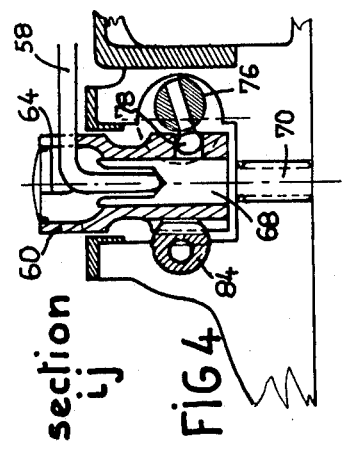
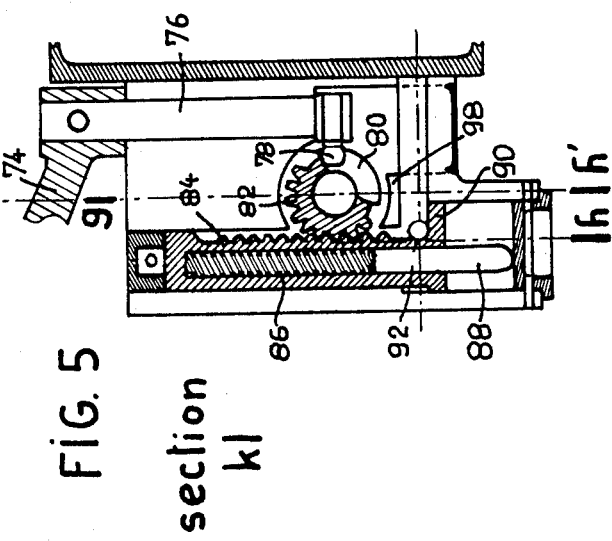

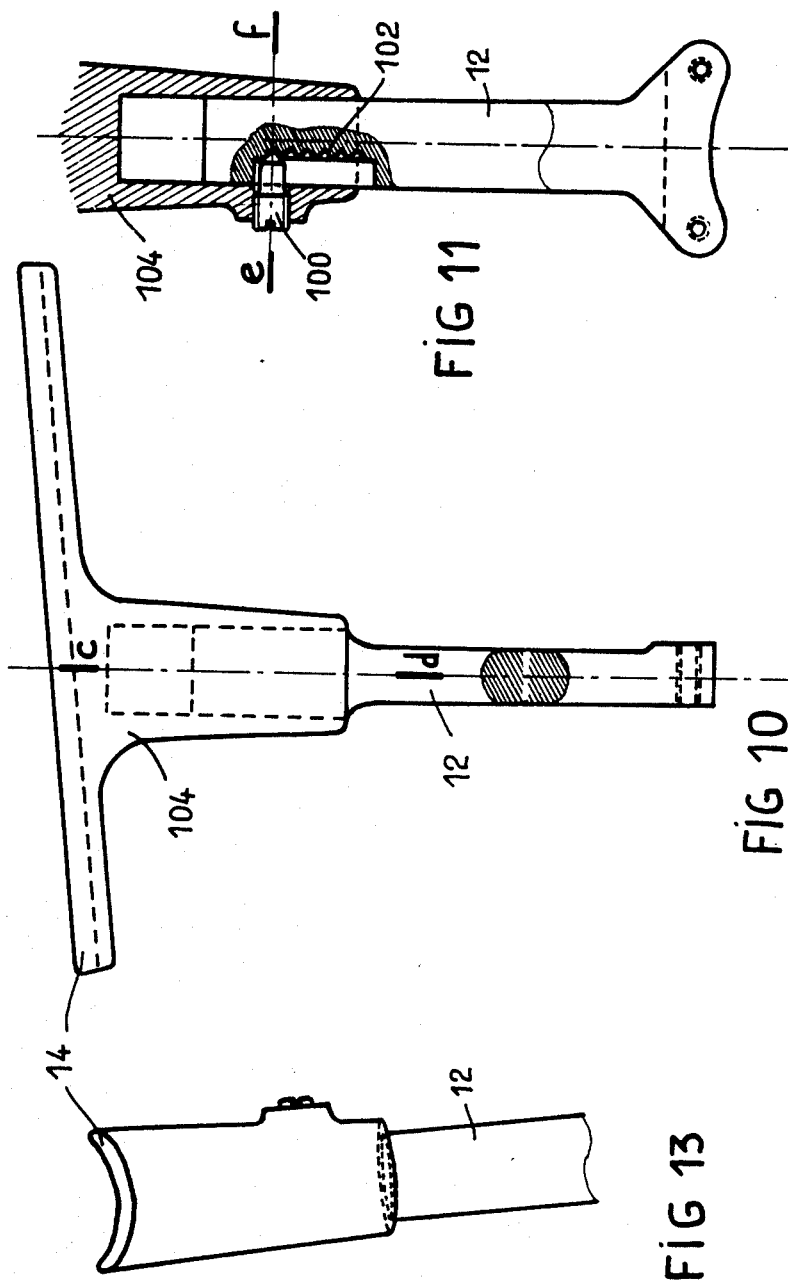

FISHING REEL

This invention relates to a revolving-spool reel for casting, and more especially to such a reel capable of being motor-operated and suitable for mounting on any type of fishing rod by means of clamping collars or a screwed connection.

In conventional reels line winding is carried out either with a fixed spool and a pivotable and rotatable line guide, or a revolving spool and a pivotable but not rotatable line guide, or a spool and line guide which both carry out synchronized and combined movements to effect winding and suitable layering of the line on the spool.

The prior art also includes motor-operated reels in which use is made of a miniature motor, supplied by a cell or, in the case of large reels, a battery or any other source of electrical energy, to effect winding of the line.

In addition to the means for coupling the reel to the motor there is often speed-varying means and a connecting/disconnecting device enabling certain maneuvres to be carried out manually.

However, all the known reels require the user to hold the rod equipped with the reel in one hand and to carry out almost all the other operations with his other hand. To make a cast, for example, he must open the line guide, take the line and hook it over one finger of the hand holding the rod. For line retrieve, he must turn a crank, causing closure of the line guide and then the winding operation proper.

There is therefore a requirement for a reel which permits automatic operation for tedious work such as spinning, consisting of a series of casts and retrieves, and manual operation for interesting work such as the actual catch.

The present invention provides a fishing reel comprising a body supporting a rotatable spool and spool driving means, a line guide pivoted about an axis fixed relative to said body, a first assembly of means for effecting pivoting of the line guide from a first position, permitting winding of the line on to the spool, to a second position, permitting unwinding of the line during casting, a second assembly of means for effecting pivoting of the line guide from the second to the first position, and means for transmitting to the spool a secondary movement ensuring suitable layering of the line on the spool.

Preferably the said spool driving means comprises a principal shaft, a secondary shaft rotationally connected to said principal shaft and carrying said spool, and a frame which is rotatable about the principal shaft and which locates the secondary shaft at an angle of inclination relative to the principal shaft, the arrangement being such that said principal shaft transmits rotary movement to the spool about the axis of said secondary shaft and that said frame transmits said secondary movement to said spool by rotation thereof about the axis of said primary shaft.

Also, the said spool driving means may comprise a crank capable of rotating an auxiliary shaft bearing on the one hand one gear of a first pair of bevel gears of which the pinion is rotationally connected to the principal shaft and on the other hand the pinion of a second pair of bevel gears of which the other gear is rotationally connected to the rotary frame.

In an advantageous embodiment, the reel is characterized in that the line guide is received by means of its two ends in two supports, the first of which can carry out both rotary and translatory motion, and in that the said first assembly of means for effecting pivoting comprises a first lever, rotation of which causes the first support to rise, causing the line guide to pivot from the first to the second position.

Similarly, a reel embodying the invention may be characterized in that the second assembly of means for effecting pivoting comprises a second lever, rotation of which effects rotation of the first support so as to cause the line guide to pivot from the second to the first position.

In a particularly advantageous embodiment, the two supports are substantially cylindrical and are equipped with a slot, the first lever for effecting pivoting is rotationally connected to a rod bearing a lifter stud for the first support, an abutment which holds the line guide in the first position is formed on the periphery of the first support, and a ramp defines one side of the slot in the second support, so that upon operation of the first lever to lift the first support and to bring the corresponding end of the line guide beyond the abutment, the inherent resilience of the line guide causes it to slide along the ramp and to pivot from the first to the second position.

According to a supplementary feature, the second lever is rotationally connected to a shaft bearing a dog for driving a rack, counteracting resilient means, the rack cooperating with teeth on the first support so as to rotate the latter, and a driving abutment is provided on, and defines the slot in, the first support, so that operation of the second lever for effecting pivoting causes the driving abutment to rotate, bringing the line guide from the second to the first position.

Further, in a fully automatic embodiment, a reel according to the invention is characterized in that it also comprises an electric motor coupled to the principal shaft by way of a clutch device and therefore capable of causing the line to be wound on to the spool.

It is an advantage in this embodiment if the second assembly of means for effecting pivoting of the line guide are also the operating means for the electric motor. This enables the motor also to be operated by the hand holding the rod, to effect winding, while the user's other hand is completely free for other uses. In addition, the device makes it possible to fish while wearing gloves.

Also, the electric motor being a reversible motor, the second assembly of means for effecting pivoting can control operation of the motor, either in the line winding direction or in the unwinding direction, by reversing the polarity of the electric motor.

According to a further preferred feature of the invention, the said first lever referred to above is pivoted on one side face of the said body and is inclined in the direction of the longitudinal axis of the body, so that the lever can be operated with a natural movement by means of pressure from the back of one of the user's fingers. This provides a particularly convenient arrangement, since the movement required to operate the said first lever is a more natural one to a user who has become used to the action required in operating a conventional reel.

The invention is illustrated by way of example in the accompanying drawings, in which:

FIGS. 4 to 8 illustrate details of the supports and of the first and second means for effecting pivoting of the line guide, FIGS. 4, 5, 7 and 8 representing sections i–j, k–l, o–p and m–n respectively through the device shown in FIG. 6, and FIG. 6 representing sections g–h and g–h' through the device shown in FIG. 5;

FIGS. 10 to 13 illustrate the adjustable means for supporting and fixing the reel to a fishing rod;

With reference to FIGS. 1, 2, 3 and 9, the reel shown therein comprises a body 10 mounted on a support 12 connected to a clamp 14 for fixing the reel to a fishing rod (not shown).

Figure 3:
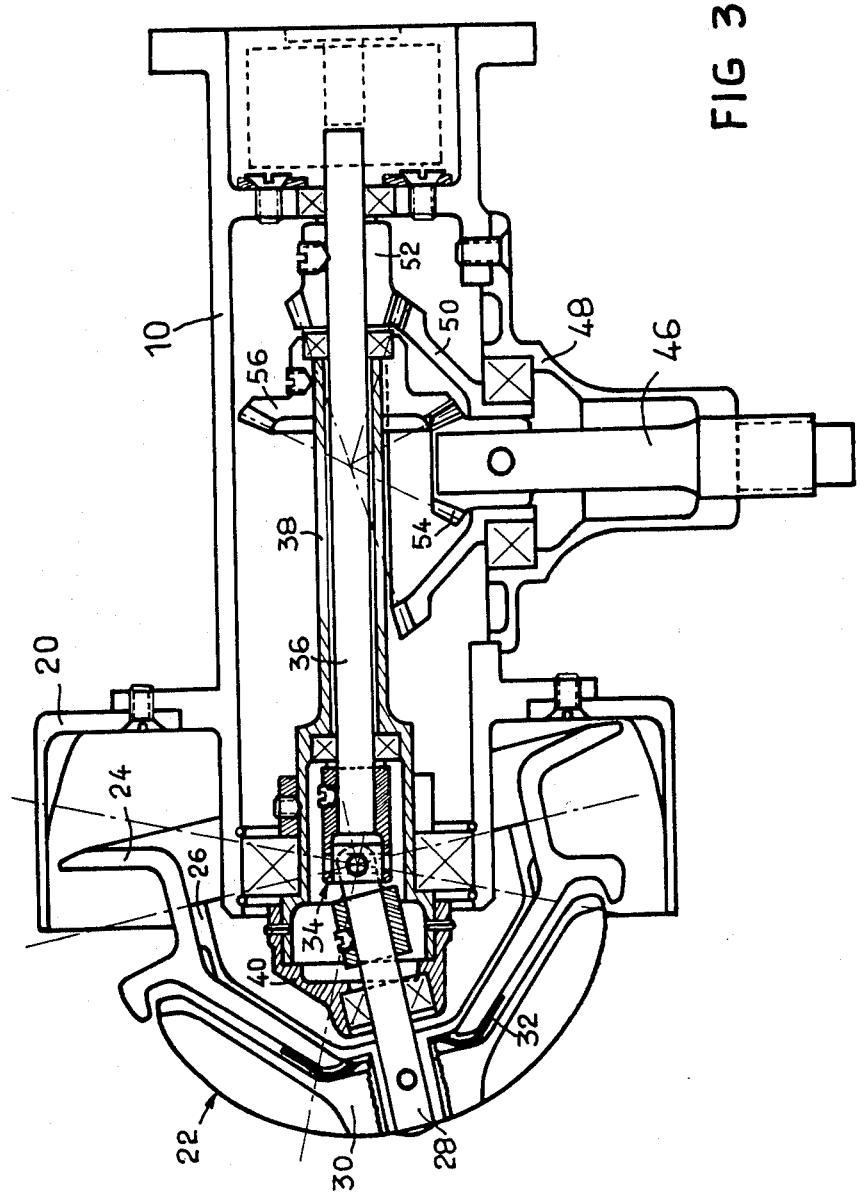
FIG. 3 shows this reel in section along a line a–b in FIG. 1.
Figure 9:
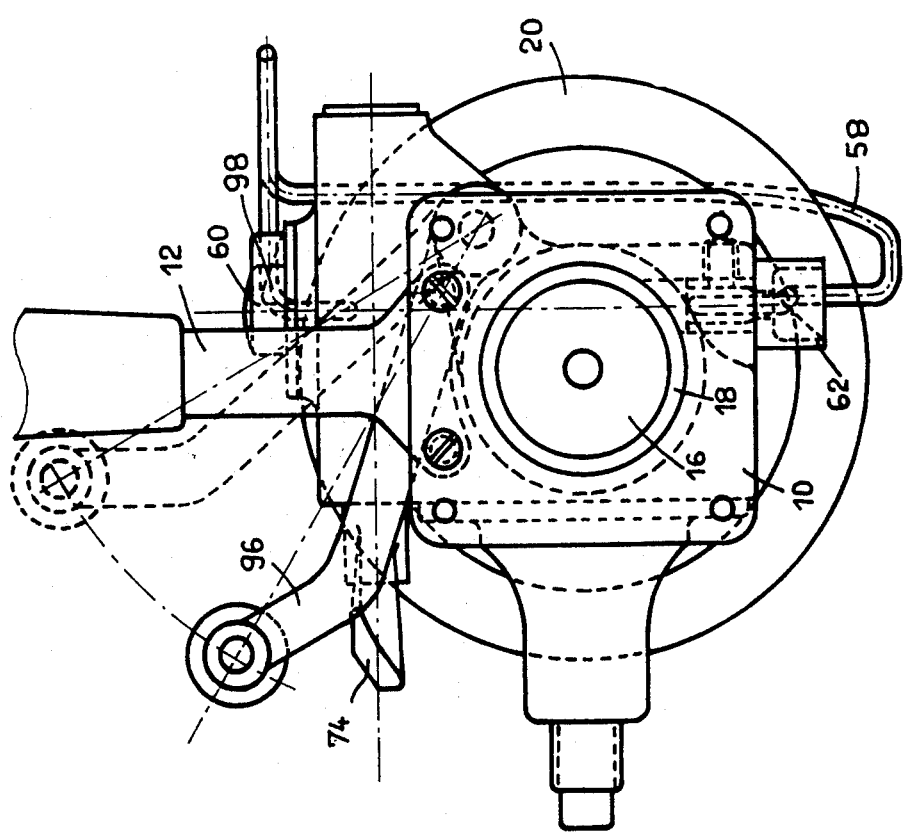
FIG. 9 illustrates the reel shown in FIGS. 1 and 2 from the right.

A miniature electric motor 16 and a centrifugal clutch device 18 are attached to the body 10 on one side, whereas a casing 20, within which a spool 22 rotates, is attached on the other. As shown in FIG. 3, the spool 22 comprises a grooved element 24, designed to receive the wound line and applied to a support 26 fixed to and rotatable with the end of a secondary shaft 28 and bearing an external thread on to which screws an element 30 which clamps a resilient element 32, acting as a torque limiting device, on to the grooved element 24.

The secondary shaft 28 is connected by way of a universal joint 34 to a principal shaft 36 rotatable in a quill shaft 38, of which the portion nearer the spool 22 is wider and receives a roller bearing allowing the quill shaft 38 to rotate inside the body 10. Also, an inclined bearing 40 mounted on the end of this wider portion receives the secondary shaft 28 and keeps the latter inclined at a constant angle to the principal shaft 36.

In addition, the reel comprises a crank formed of a handle 42 and an operating lever 44 and mounted on the end of an auxiliary shaft 46, which is free to rotate in a casing 48 attached to the body 10, and of which the inner end is rotationally connected to two gears belonging respectively to two pairs of bevel gears. The larger gear 50 meshes with a corresponding gear 52 rotationally connected to the principal shaft 36, whereas the smaller gear 54 meshes with a corresponding gear 56 rotationally connected to the quill shaft 38.

The end of the principal shaft 36 not connected to the universal joint 34 passes through a bearing inside the body 10 and can be rotated by way of the centrifugal clutch device 18 and electric motor 16 when the latter is set in motion.

The reel also comprises a line guide 58, of a conventional type well known among existing reels, pivotable about an axis fixed relative to the body 10 from a winding position (FIG. 2) into a line casting position (FIGS. 1 and 9 and reference 59 in FIG. 2) and vice versa. The line guide 58 is received by means of its two ends in two substantially cylindrical supports 60, 62. These supports 60, 62 and the means for pivoting the line guide will be described in more detail with reference to FIGS. 4 to 8.

The support 60 contains a slot 64 developed over approximately a quarter of its circumference and defined at one end by a driving abutment 66. The support 60, comprising a plug 68 on which one end of the line guide 58 abuts, can carry out rotary and axial translatory motion relative to the body 10 by means of its foot 70.

The support 62, which is fixed to the body 10, also contains a slot 72 open over about a quarter of its circumference, but this slot is defined at one end by an axial cut and at the other by a cut defining a ramp.

The inherent resilience of the line guide 58 applies its two ends, passing through the slots 64, 72, permanently to the supports 60, 62.

Figure 1:
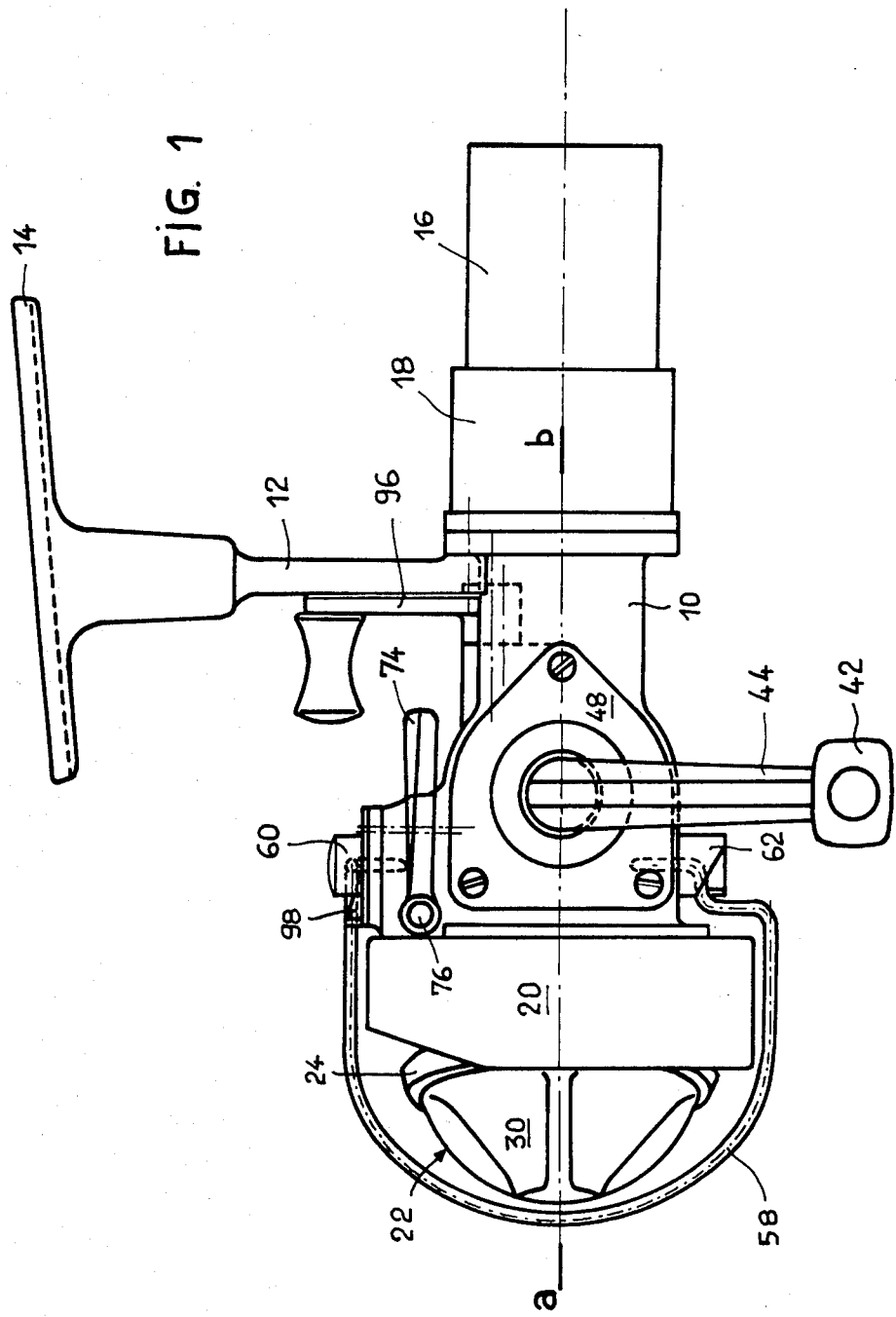
FIG. 1 illustrates a side elevation of a reel embodying the invention.
Figure 2:
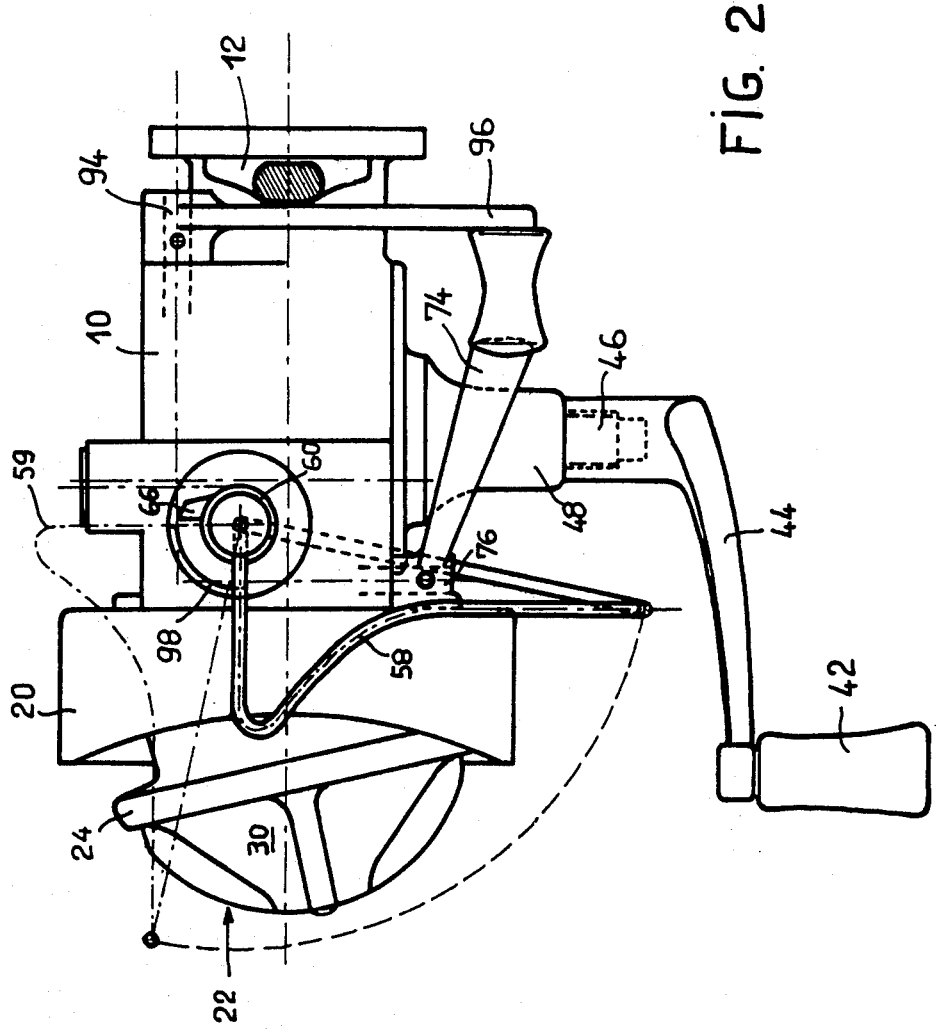
FIG. 2 is a plan view of the same reel.

Pivoting of the line guide 58 is effected, on the one hand, by a first pivoting lever 74 rotationally connected to a rod 76 whose end bears a lifter stud 78 capable of entering an aperture 80 in the support 60 which, moreover, comprises external teeth 82 cooperating with a rack 84 movable in a transverse bore in the body 10, counteracting resilient means consisting of a spring 86 placed in the rack 84 and held in this position by an element 88 supported on a plug closing the transverse bore. On the other hand, the rack is provided with a ledge 90 behind which there is a driving dog 92 for the rack, the dog being rotationally connected to a shaft 94 parallel to the principal shaft 36 and rotated by a second pivoting lever 96. An abutment 98 provided adjacent the periphery of the support 60 and forming a ramp with the shape of a circular sector locks the line guide 58 in the winding position (FIGS. 2 and 6).

To allow the position of the reel relative to the fishing rod to be adapted to the individual user, the support 12 for the reel body 10 is adjustable. This is done by means of a fixing screw 100 (FIGS. 10 to 13) cooperating with teeth 102 on the support 12, which is slidable in a bore in a sleeve 104 attached to the clamp 14. The distance of the reel from the fishing rod can therefore be adjusted so that the user can manipulate the levers 74 and 96 with the forefinger of the hand holding the fishing rod.

Figure 14:
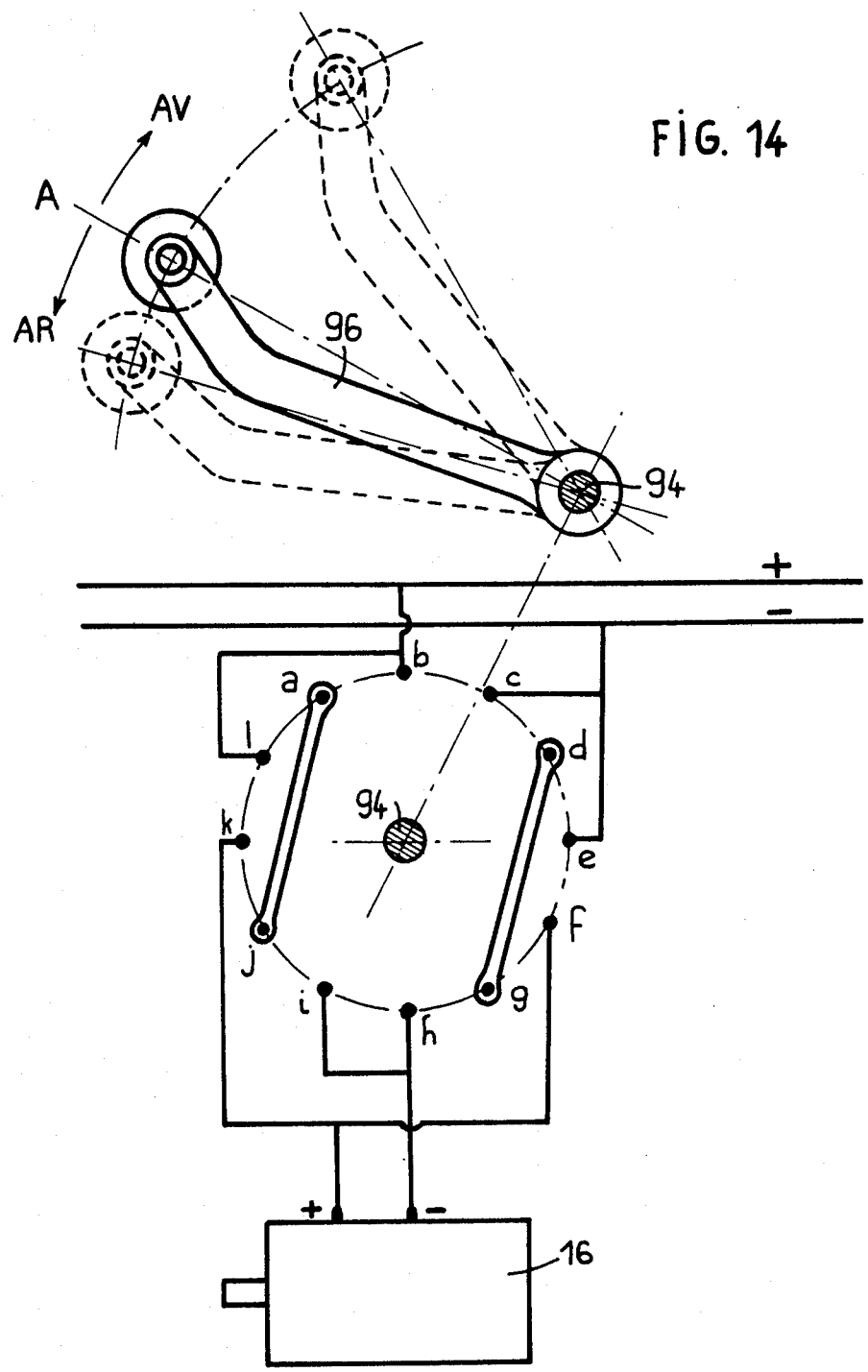
FIG. 14 is a diagram illustrating the supply circuit for the electric motor for the reel in the embodiment described below.

Referring to FIG. 14, for operation of the electric motor 16, a rotary contactor 106 in the form of a disc bearing two conductor elements 108 is rotationally connected to the shaft 94 and therefore to the second lever 96.

This rotary contactor is placed opposite twelve contact studs a to l, studs b and l being connected to the positive line of a circuit supplying direct current from a source of electrical energy consisting, for example, of cells housed in the stem of the fishing rod, studs c and e being connected to the negative line of the same circuit, studs f and k being connected to the positive terminal of the electric motor 16, which is a reversible motor, and studs h and i being connected to the negative terminal of this motor.

In the idle position A of the second lever 96, in which the electric motor 16 is inoperative, the conductor elements 108 connect the studs a, j and d, g. Moving the lever 96 in the direction AV, the studs b, e are connected to the studs k, h respectively, causing the motor to turn in the "forward" direction, which is the line winding direction. Conversely, moving the lever 96 in the direction AR connects the studs l, c to the studs i, f respectively, rotating the motor in the "reverse" direction, which is the unwinding direction, which may be useful if the user wishes to alter the "banner," that is, that section of the line between the surface of the water and the end of the fishing rod.

The reel described operates as follows. To cast, assuming that the line has been reeled in and the line guide 58 is in the winding position, the user of a fishing rod equipped with such a reel need merely pass the forefinger of the hand holding the rod beneath the first lever 74 so as to draw the latter towards the rod. Turning the lever 74 also turns the rod 76 and the lifter stud 78 which lifts the first support 60 of the line guide 58, the end of which is therefore brought beyond the abutment 98 on the periphery of the first support 60, so that the line guide 58, due to sliding along the ramp defining the slot 72 in the second support 62 and due to its inherent resilience, pivots from the winding position to the casting position, the pivoting being restricted by the edges of the slots 64, 72. The ramp in the slot 72 thus acts as a torsion spring on the end of the line guide, so as to ensure pivoting.

Now that the line guide 58 is in the position shown at 59 in FIG. 2, the angler can cast.

Since the second pivoting lever 96 is directly accessible to the forefinger of the hand holding the rod from the first pivoting lever 74 when the latter has been operated to wind the line, the angler need merely pull on the second lever 96, the turning of which turns the driving dog 92 for the rack 84 meshing with the teeth 82, so causing rotation of the first support 60 carrying the driving abutment 66, which brings the line guide 58 from the casting position to the winding position, locking it in the latter position behind the peripheral abutment 98.

Further movement of the second lever 96 in the same direction (in the direction of the arrow AV in FIG. 14) starts the reversible electric motor 16 in the "forward" direction, as already explained, so that the line wind-up is effected by driving the principal shaft 36, the secondary shaft 28 by means of the universal joint 34 and therefore the spool 22, and, simultaneously, the gears 52, 50 and thus also the gears 54, 56, rotating the frame consisting of the quill shaft 38 and inclined bearing 40 and so producing a secondary rotary or precessional movement of the spool 22, to layer the line in the groove in the element 24. The ratios of the gears 50, 52, 54 and 56 are of course selected to ensure suitable layering, such as may be obtained, for example, with one revolution of the frame for every three revolutions about the secondary shaft 28.

If a fish should take the hook, the motor may not have enough power to ensure reeling-in. Also, the angler may prefer to make his catch manually. He then releases the second lever 96, which is returned to the idle position A by the spring 86, pushing back the rack 84, and with his free hand he winds in the line using the handle 42 of the crank, rotation of which entrains the gears 50, 54 and thus, as already stated, rotates the spool 22 so as to wind and layer the line.

To change the length of line between the surface of the water and the end of the rod, as already stated, the angler can push the second lever 96 with his forefinger to run the reversible electric motor 16 in "reverse" (arrow AR in FIG. 14) by reversing the polarity of the motor.

Obviously, a conventional disconnectable non-return device may be mounted on the shaft 46 of the crank in a known manner.

Within the scope of the invention, also, a driving motor of any type, not attached to the reel or fishing rod, may be coupled to the principal shaft 36 by means of flexible shafting or an equivalent connection.

The reel described can therefore be used for any type of fishing, whether sport fishing or commercial fishing, since it has proved easy to handle, effective and highly versatile.

Figure 15:
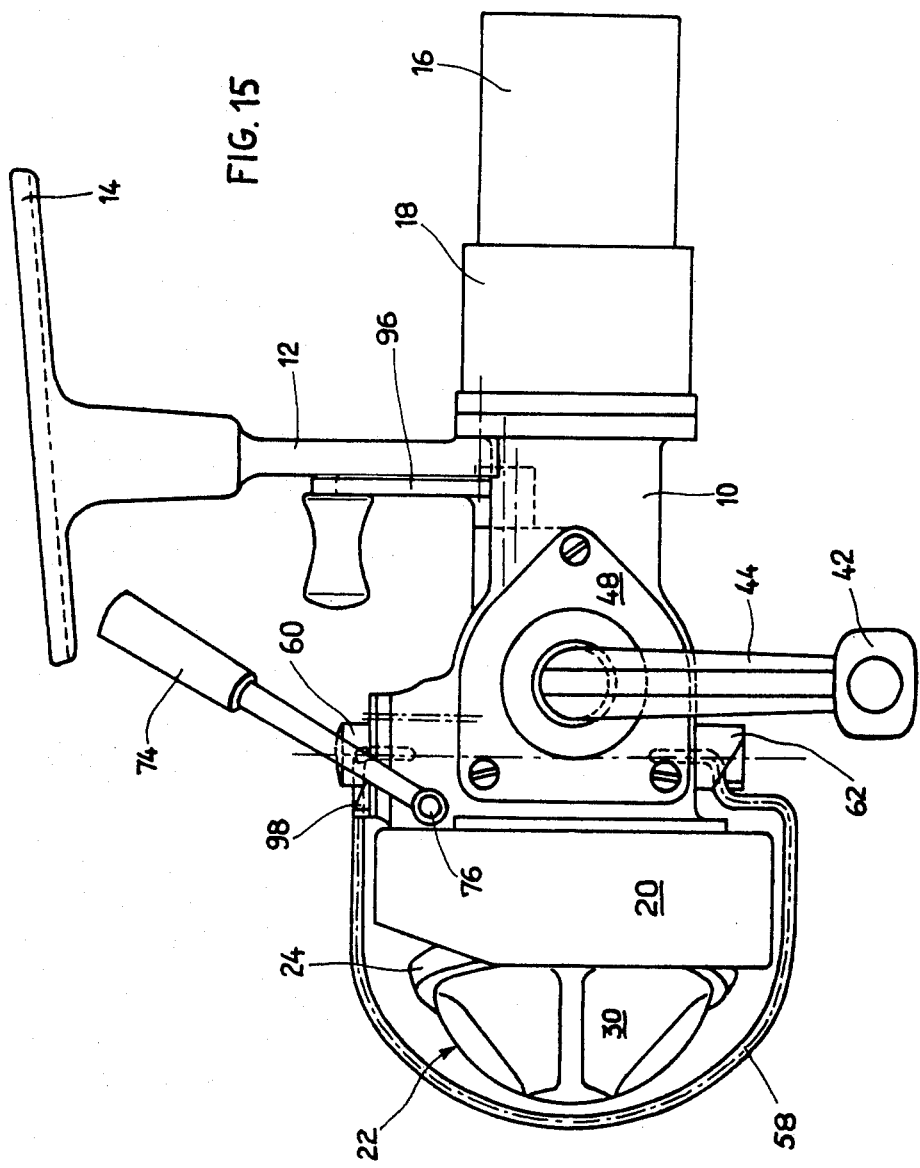
FIGS. 15 and 16 are views similar to FIGS. 1 and 2 of another embodiment of reel according to the invention.
Figure 16:
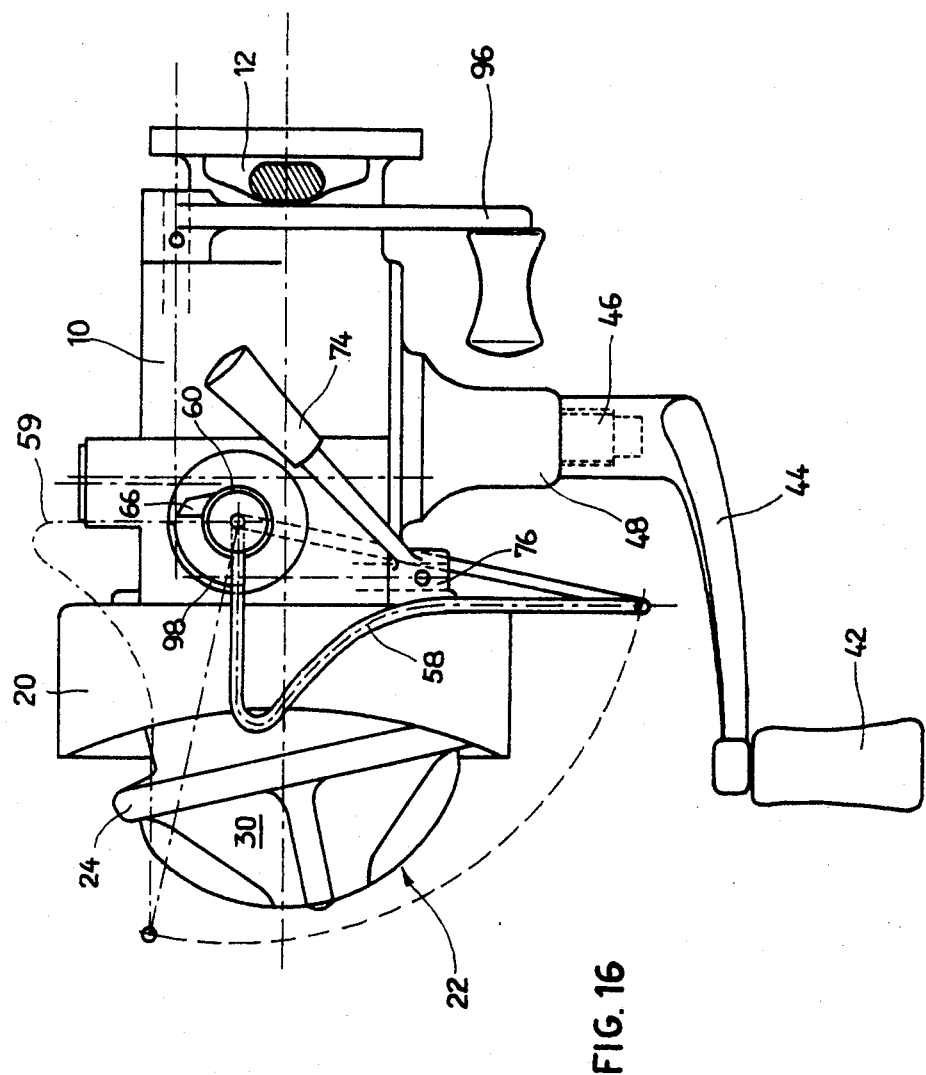

Referring now to FIGS. 15 and 16, there is shown a further embodiment of reel which provides for more convenient manual actuation than that required for the reel described above. In the case of the reel described above, assuming that the line is reeled in and the line guide is in the winding position, and that the user of a fishing rod equipped with the reel wants to make a cast, he must pass the forefinger of the hand holding the rod beneath the first lever 74 so that he can then draw the latter towards the rod. This movement does not come naturally to the user, firstly because it forces him to move a bent forefinger away from the rod (so that the back of the forefinger does not hit either of the two pivoting levers), to extend it beneath the first lever 74, and then to bring his extended forefinger back towards the rod; and secondly because with conventional reels, after the line guide has been pivoted by the hand which does not hold the rod, casting is carried out with a movement of the forefinger, which is moved away from the rod to release the line (previously pinned against the rod).

For these reasons use of a reel as described above may, to the inexperienced user, give rise to some confusion between the movements and/or some difficulty in the holding of the fishing rod prior to casting.

The reel shown in FIGS. 15 and 16 has been developed to overcome these drawbacks. In FIGS. 15 and 16, like numerals designate like parts as shown in FIGS. 1–14, and with the exception of the lever 74 the construction and operation is precisely the same as that described above and will not therefore be described in more detail.

However, the first lever 74, which in turning rotates the rod 76 to whose end it is fixed, so lifting the first support 60 and pivoting the line guide 58 from the winding position to the unwinding position, is pivoted on the side face of the body 10 from which the end of the rod 76 projects, and is inclined in the direction of the longitudinal axis of the body 10, preferably to the extent that its end and the central plane of the body 10 intersect. Consequently the lever 74 can be operated by means of a natural movement of the user, who pushes it with the back of one finger, thus doing exactly what an angler habitually does when using a conventional reel.

What I claim is:

1. A fishing reel having a body supporting a rotatable spool, a spool driving means, and a spool layering means; wherein:
   said spool driving means comprises:
   a principal shaft rotatably supported in said body;
   a secondary shaft rotationally connected to said principal shaft, said spool being operatively associated with one end of said secondary shaft; and,
   a frame rotatable about said principal shaft and including bearing means coupled with the other end of said secondary shaft and locating said secondary shaft at an angle of inclination relative to said principal shaft, the arrangement being such that rotary movement of said principal shaft transmits a primary movement to said spool for rotation thereof about the axis of said secondary shaft; and
   said spool layering means comprises:
   a line guide pivoted about an axis fixed relative to said body;
   a first assembly including means for pivoting said line guide from a first position in which the line can be wound onto said spool to a second position in which which the line is unwound from said spool during casting;

a secondary assembly including means for effecting pivoting of said line guide from the second position to the first position; and, means for transmitting a secondary movement to said spool ensuring suitable layering of the line onto said spool, said transmitting means including said frame for transmitting the secondary movement to said spool, said frame rotating said spool about the axis of said principal shaft.

2. A fishing reel as claimed in claim 1, wherein said frame includes a quill shaft coupled with said bearing means, said quill shaft being coaxial with said principal shaft, and gearing coupling said quill shaft to said principal shaft when the line is wound onto said spool for rotation of said quill shaft with said principal shaft to revolve the axis of said secondary shaft at an angle of inclination to said principal shaft.

3. A fishing reel as claimed in claim 2, wherein said spool driving means comprises an auxiliary shaft and a crank for rotating said auxiliary shaft;
said gearing includes first and second sets of bevel gears, connected with said auxiliary shaft, and one gear of said second set of bevel gears being connected with said principal shaft.

4. A reel as claimed in claim 3, including
first and second supports, said line guide having two ends, each received in one of said supports, said first support being adapted for rotary and axial translatory motion;
said two supports being substantially cylindrical and each having a slot;
said first assembly comprising a first lever rotation of which causes said first support to rise in the axial translatory motion thereby causing said line guide to pivot from the first to the second position;
a rod bearing a lifter stud for said first support, said first lever being rotationally connected to said rod;
an abutment formed on the periphery of said first support for holding said line guide in the first position; and,
a ramp defining one side of the slot in said second support, so that operation of said first lever to lift said first support and to bring the corresponding end of said line guide beyond said abutment, and the inherent resilience of said line guide causes it to slide along said ramp and to pivot from the first to the second position.

5. A reel as claimed in claim 4, in which said second assembly comprises a second lever, whereby rotation of said second lever effects rotation of said first support thereby to cause said line guide to pivot from the second to the first position.

6. A reel as claimed in claim 5, including:
a rack, said first support having teeth, said rack cooperating with said teeth for rotation of said first support;
a second lever, a shaft rotationally connected with said second lever for driving said rack, said last-mentioned shaft bearing a dog for driving said rack; and
a driving abutment formed on one end of said first support adjacent the slot thereof, so that operation of said second lever for effecting pivoting thereof causes said driving abutment to rotate, thereby pivoting the line guide from the second to the first position.

7. A reel as claimed in claim 1, in which the said spool driving means comprises a crank capable of rotating an auxiliary shaft bearing on the one hand one gear of a first pair of bevel gears of which the pinion is rotationally connected to the principal shaft and on the other hand the pinion of a second pair of bevel gears of which the other gear is rotationally connected to the rotary frame.

8. A reel as claimed in claim 1, in which the line guide is received by means of its two ends in two supports, the first of which can carry out both rotary and translatory motion, and in which the said first assembly of means for effecting pivoting comprises a first lever, rotation of which causes the first support to rise, causing the line guide to pivot from the first to the second position.

9. A reel as claimed in claim 8, in which the said second assembly of means for effecting pivoting comprises a second lever, rotation of which effects rotation of the first support so as to cause the line guide to pivot from the second to the first position.

10. A reel as claimed in claim 8, in which the said two supports are substantially cylindrical and are each equipped with a slot; the first lever for effecting pivoting is rotationally connected to a rod bearing a lifter stud for the first support; an abutment which holds the line guide in the first position is formed on the periphery of the first support; and a ramp defines one side of the said slot in the second support, so that upon operation of the first lever to lift the first support and to bring the corresponding end of the line guide beyond the abutment, the inherent resilience of the line guide causes it to slide along the ramp and to pivot from the first to the second position.

11. A reel as claimed in claim 9, in which the second lever is rotationally connected to a shaft bearing a dog for driving a rack, counteracting resilient means, the rack cooperating with teeth on the first support so as to rotate the latter, and a driving abutment is provided on, and defines the slot in, the first support, so that operation of the second lever for effecting pivoting causes the driving abutment to rotate, bringing the line guide from the second to the first position.

12. A reel as claimed in claim 1, which also comprises an electric motor coupled to the principal shaft by way of a clutch device and therefore capable of causing the line to be wound on to the spool.

13. A reel as claimed in claim 12, in which the said second assembly of means for effecting pivoting of the line guide are also the operating means for the electric motor.

14. A reel as claimed in claim 13, in which the electric motor is a reversible motor, and the second assembly of means for effecting pivoting can control operation of the electric motor, either in the line winding direction or in the unwinding direction, by reversing the polarity of the electric motor.

15. A reel as claimed in claim 8, in which the said first lever is pivoted on one side face of the said body and is inclined in the direction of the longitudinal axis of the body, so that the lever can be operated with a natural movement by means of pressure from the back of one of the user's fingers.

* * * * *

UNITED STATES PATENT AND TRADEMARK OFFICE
CERTIFICATE OF CORRECTION

PATENT NO. : 4,108,392
DATED : August 22, 1978
INVENTOR(S) : Jean Masclet

It is certified that error appears in the above-identified patent and that said Letters Patent are hereby corrected as shown below:

On the cover sheet delete

--[73]Assignee: S.E.D.I.C., Montrouge, France--

In addition, please note that in Column 1, line 22, "maneuvres" should be --maneuvers--.

Signed and Sealed this

Twelfth Day of June 1979

[SEAL]

Attest:

RUTH C. MASON
Attesting Officer

DONALD W. BANNER
Commissioner of Patents and Trademarks